US008666087B2

(12) United States Patent
Pfaffinger

(10) Patent No.: US 8,666,087 B2
(45) Date of Patent: Mar. 4, 2014

(54) INTEGRATED AUDIO/COMMUNICATION SYSTEM FOR USE IN A MOTOR VEHICLE

(75) Inventor: Gerhard Pfaffinger, Regensburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1835 days.

(21) Appl. No.: 10/476,169

(22) PCT Filed: Apr. 11, 2002

(86) PCT No.: PCT/EP02/04053
§ 371 (c)(1),
(2), (4) Date: Apr. 9, 2004

(87) PCT Pub. No.: WO02/089452
PCT Pub. Date: Nov. 7, 2002

(65) Prior Publication Data
US 2004/0165733 A1     Aug. 26, 2004

(30) Foreign Application Priority Data
Apr. 26, 2001 (DE) .................................. 101 20 525

(51) Int. Cl.
H04B 1/00 (2006.01)
H04B 3/00 (2006.01)
H04M 1/00 (2006.01)

(52) U.S. Cl.
USPC ........................... 381/86; 381/81; 455/569.2

(58) Field of Classification Search
USPC .................................. 381/86, 81; 455/569.2
See application file for complete search history.

(56) References Cited

U.S. PATENT DOCUMENTS

| 4,061,874 | A | * | 12/1977 | Fricke et al. | 381/57 |
| 4,628,526 | A | | 12/1986 | Germer | 381/57 |
| 4,912,758 | A | | 3/1990 | Arbel | 379/388 |
| 4,965,822 | A | | 10/1990 | Williams | 379/390 |
| 4,982,427 | A | | 1/1991 | Nicolai | 379/406 |
| 5,054,061 | A | | 10/1991 | Yoshida | 379/390 |
| 5,434,922 | A | | 7/1995 | Miller et al. | 381/57 |
| 5,615,270 | A | | 3/1997 | Miller et al. | 381/57 |
| 6,134,456 | A | | 10/2000 | Chen | 455/569 |
| 6,154,649 | A | | 11/2000 | Reichstein | 455/426 |
| 6,157,725 | A | * | 12/2000 | Becker | 381/86 |
| 6,349,223 | B1 | * | 2/2002 | Chen | 455/569.2 |
| 6,370,254 | B1 | | 4/2002 | Gore et al. | 381/104 |
| 6,862,357 | B1 | * | 3/2005 | Albus et al. | 381/86 |

FOREIGN PATENT DOCUMENTS

| DE | 29922999 | 8/2000 | ........................ 1/60 |
| DE | 19933067 | 1/2001 | |
| DE | 19934863 | 1/2001 | |

(Continued)

*Primary Examiner* — Vivian Chin
*Assistant Examiner* — Douglas Suthers
(74) *Attorney, Agent, or Firm* — O'Shea Getz P.C.

(57) ABSTRACT

An integrated audio/communication system for use in a motor vehicle includes a processing unit that selectively executes control routines/programs based upon the operational mode of the system. The system may operate in a audio playback mode, and in a telephony mode. In the audio playback mode the processing unit executes a control routine/program associated with audio playback. Whereas, in the telephony mode the processing unit executes a control routine/program associated with telephony. The operational mode of the system may be switched from audio playback to telephony, and visa versa. Selectively configuring the processing unit based upon the operational mode of the system, and allowing the system to easily transition between modes, provides a highly integrated audio/communication system for use in a motor vehicle.

3 Claims, 1 Drawing Sheet

(56) References Cited

FOREIGN PATENT DOCUMENTS

| DE | 19939631 | 2/2001 |
| DE | 19946344 | 4/2001 |
| EP | 0319777 | 8/1994 | ......... 3/32 |
| EP | 10472749 | 10/2000 | |
| GB | 2 248 001 | 3/1992 | ......... 3/32 |
| WO | WO9903198 | 1/1999 | |

* cited by examiner

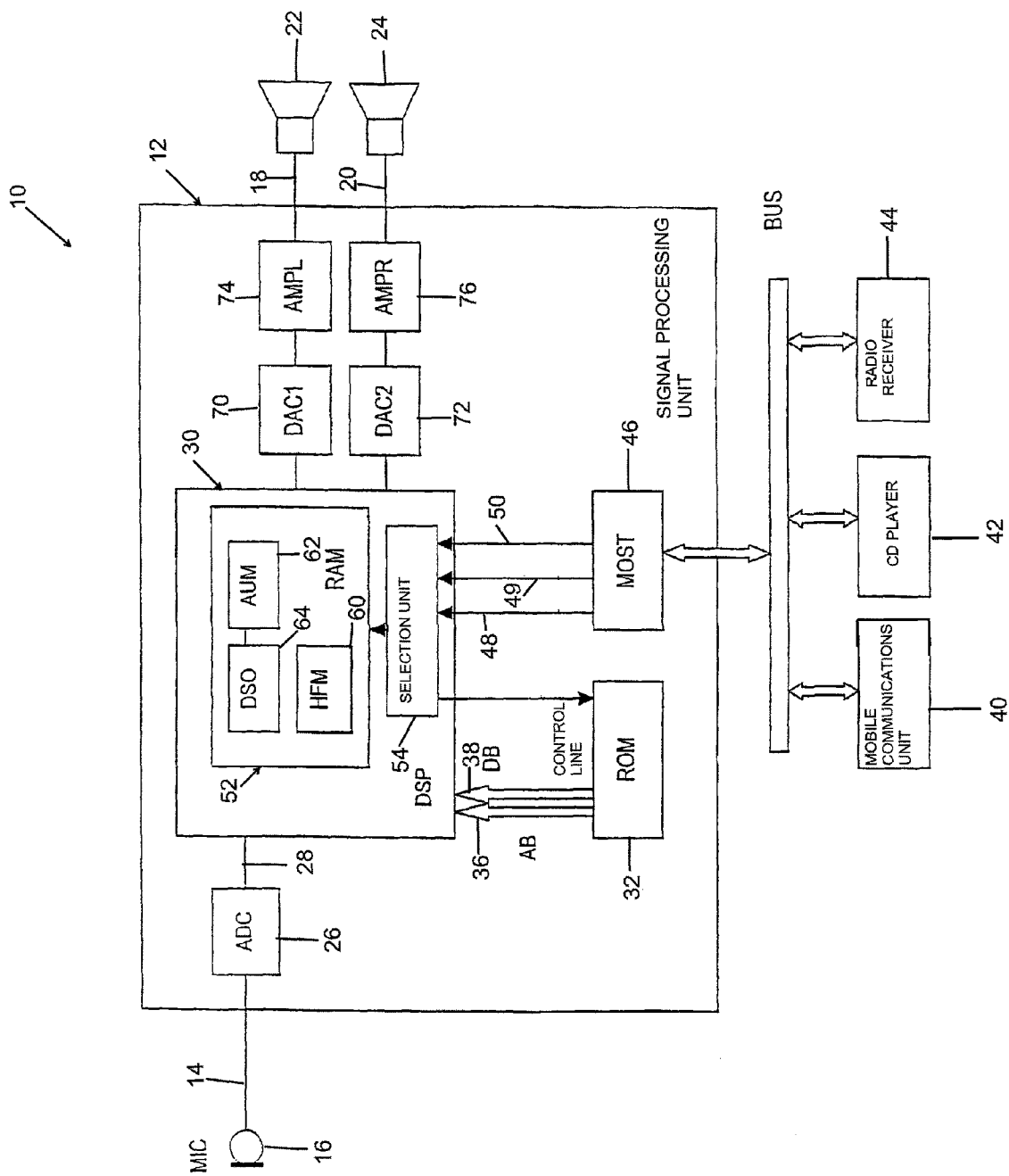

INTEGRATED AUDIO/COMMUNICATION SYSTEM FOR USE IN A MOTOR VEHICLE

1. CLAIM OF PRIORITY

This patent application claims priority from PCT application PCT/EP02/04053 filed Apr. 11, 2002, which claims the benefit of German patent application DE 101 20 525.2 filed Apr. 26, 2001.

2. FIELD OF THE INVENTION

The invention relates to the field of motor vehicle radio and telephone systems, and in particular to a system for audio playback and hands-free telephony operation in a motor vehicle.

3. RELATED ART

Audio systems including CD players, radio receiver units, output stages and loudspeakers are often standard equipment in motor vehicles. In addition, mobile communications equipment (e.g., both permanently installed and mobile with fixed interface) has found increasing acceptance in motor vehicles. However, the audio system and the communication system have been installed in the vehicle as completely separate systems, with the result that the required expense for materials and installation is relatively high.

Therefore, there is a need for an integrated audio/communication system for use in a motor vehicle.

SUMMARY

An integrated audio/communication system for use in a motor vehicle includes a processing unit that selectively executes control routines/programs based upon the operational mode of the system. The system may operate in a audio playback mode, and in a telephony mode.

In the audio playback mode the processing unit executes a control routine/program associated with audio playback. Whereas, in the telephony mode the processing unit executes a control routine/program associated with telephony. The operational mode of the system may be switched from audio playback to telephony, and visa versa. Selectively configuring the processing unit based upon the operational mode of the system, and allowing the system to easily transition between modes, provides a highly integrated audio/communication system for use in a motor vehicle.

The processing unit includes a processor (e.g., a digital signal processor) that executes the control routine/program associated with the presently selected operational mode of the integrated audio/communication system. A non-volatile program memory stores the various executable routines/programs, and an interface unit (e.g., a MOST interface unit) interfaces the processing unit to a multimedia bus (e.g., a ring bus). For example, the multimedia bus may be configured as a MOST bus, to which are connected components such as a mobile communications unit, various audio/video devices such as a CD player and a radio receiver. For example, a control routine/program for audio playback and a program for hands-free telephony operation are stored in the program memory. The control routine program for hands-free telephony operation is loaded into the processing unit and executed during telephony operation. Similarly, to initiate audio playback the program for audio playback is loaded from program memory as necessary and executed by the processing unit. Dynamically configuring the processing unit based upon the desired operating mode of the system provides an integrated audio/communication system for use in a motor vehicle.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

The FIGURE is a block diagram illustration of an integrated audio/communication system for use in a motor vehicle.

DETAILED DESCRIPTION

The FIGURE is a block diagram illustration of an integrated audio/communication system 10 for use in a motor vehicle. The system 10 includes a signal processing unit 12, which receives an audio input signal on a line 14 from a microphone 16, and provides audio output signals on lines 18, 20 to loudspeakers 22, 24, respectively. The microphone 16 is positioned within the vehicle to capture ambient noise within the vehicle, as well as speech from the vehicle driver and/or the passenger(s). The signal processing unit 12 includes an analog-to-digital (ADC) converter 26 that provides a digitized audio input signal on a line 28 to a processing unit 30 (e.g., a digital signal processor). The signal processing unit 12 also includes non-volatile program memory 32 (e.g., ROM) that stores and provides various executable control routines/programs to the processing unit 30. The executable control programs resident within the program memory 32 may be provided to the processing unit 30 based upon the operating mode of the integrated audio/communication system 10. The program memory 32 is connected to the processing unit via an address bus 36 and a data bus 38.

The signal processing unit 12 communicates with various units such as a mobile communication unit 40, a CD player 42 and a radio receiver 44, via a communication bus interface 46, such as for example a Media Oriented Systems Transport (MOST) bus interface. The mobile communications unit, CD player, and radio receiver may be designed to be either combined with the signal processing unit, each as a separate entity, or in combination. The bus interface 46 provides signals such as a ring signal on a line 48, a hook signal on a line 49 and an audio signal on a line 50 to the signal processing unit. These signals may be separate or combined within a bus.

The processing unit 30 includes processor memory 52 (e.g., RAM) in which the current control routine/program being executed is stored. The determination regarding which control routine/program is loaded into the processor memory 52 from nonvolatile program memory 32 and executed is made by a selection unit 54, which is implemented either in the processing unit 30 or external to the processing unit. The selection unit 54 determines the control routine/program to execute, based upon the signals provided by the bus interface 46. For example, when the selection unit 54 receives a receiver off hook signal on the line 49, the selection unit 54 causes the processor unit 30 to initiate loading of a hands free telephony control routine 60 from the nonvolatile memory 32 into processor memory 52, and then launches the control program just loaded to initiate telephony mode operation.

The control routines/programs may include the hands-free telephony control routine 60, an audio playback control routine 62 and a dynamic sound optimization routine 64. The system may selectively operate interchangeably for example in a telephony mode or an audio playback mode, and the control routine(s) to be executed by the processing unit 30 is/are selected based upon the desired system mode. For example, the selection unit 54 may select the audio playback control routine 62, which may be operated with or without the program 64 for dynamic sound optimization. When operating in the audio playback mode, if the mobile communication unit 40 receives a telephone call, the selection unit 54 detects the ring via the ring signal on the line 48 and interrupts the audio playback program 62. In response, for example, a ring tone is output through the loudspeakers 22, 24 via digital-to-analog converters (DACs) 70, 72 and amplifiers 74, 76, respectively. If the receiver is not taken off-hook (e.g., as indicated via the off hook signal on the line 49), the processing unit 30 returns to audio playback mode operation upon termination of the ring.

When the receiver is taken off-hook (with or without the preceding ring signal), the audio playback control routine/program 62 executing in the processing unit 30 is terminated, and the hands-free telephony control routine 60 is loaded from nonvolatile program memory 32 into processor memory 52, and the hands-free telephony control routine is launched. The receiver off-hook signal indicates whether or not a telephone call is in progress or is about to be initiated, and any music playing is appropriately switched off during the call to ensure the best possible transmission of speech. When the receiver is taken off-hook or a comparable action occurs (e.g., pressing an appropriate button), the audio playback is stopped, and the hands-free telephone control program 60 loads and runs while the receiver off-hook signal is being generated (i.e., while "receiver is off-hook"). In general, the selection unit 54 responds to input signals to select the desired system operating mode, and initiates loading the control routine(s) associated with the desired system operating mode for execution by the processing unit.

When the receiver is hung up or an analogous action is effected (e.g., by pressing an appropriate button), the hands-free program is interrupted, and the audio playback control program 62 is loaded and run. In addition, when the telephony unit may generate the ring signal and transmit it to the signal processing unit 12 so the audio playback control routine 62 is interrupted when the ring signal occurs. Dynamically configuring the processing unit based upon the desired operating mode of the system provides an integrated audio/communication system for use in a motor vehicle.

The microphone 16 may be used to sense the noise level within the vehicle and provide a signal indicative thereof for use by the dynamic sound optimization control routine 64.

The microphone may also be used to receive speech from the vehicle driver and/or occupants. In addition, the loudspeakers 22, 24 may be selectively used for audio playback, as well as outputting the received telephony signal.

Any of a number of conventional techniques may be employed in the program for dynamic sound optimization, such as those disclosed in U.S. Pat. Nos. 5,434,922 and 5,615,270; GB Patent 2,248,001; and EP Patents 0 319 777 and 0 141 129, etc. Similarly, any of a number of hands-free techniques, such as those disclosed in U.S. Pat. Nos. 4,912,758; 4,965,822; 4,982,427 and 5,054,061, may be employed as the basis for the hands-free program. Techniques used in audio signal playback include, specifically: filter routines, compression routines, and attenuation routines, et cetera.

An advantage of the illustrated system is that the generally high-performance signal processor provided for audio signal processing is also available for hands-free telephony operation. This provides higher quality telephony audio than is the case when employing the signal processors conventionally used in mobile communications.

The illustrations have been discussed with reference to functional blocks identified as modules and components that are not intended to represent discrete structures and may be combined or further sub-divided. In addition, while various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. A controller for an integrated audio/communication system for use in a motor vehicle that receives an audio signal from an audio source, and a telephony audio signal and a telephony control signal from a wireless telephone unit, the controller comprising:
   a bus interface that receives (i) the telephony control signal, (ii) the audio signal and (iii) the telephony audio signal via a bus interface;
   a memory device that stores an audio playback control routine and a telephony control routine; and
   a processor that receives the telephony control signal, and selectively executes one of the audio playback control routine and the telephony control routine based upon the state of the telephony control signal, and provides an output signal indicative of a selected one of the audio signal or the telephony audio signal.

2. The controller for an integrated audio/communication system for use in a motor vehicle of claim 1, where the processor comprises a digital signal processor.

3. The controller for an integrated audio/communication system for use in a motor vehicle of claim 2, where the memory comprises a non-volatile memory device that is connected to the digital signal processor via an address bus and a data bus.

\* \* \* \* \*